United States Patent
Park

(10) Patent No.: US 9,842,522 B2
(45) Date of Patent: Dec. 12, 2017

(54) STRETCHABLE DISPLAY APPARATUS WITH COMPENSATING SCREEN SHAPE

(71) Applicant: SAMSUNG DISPLAY CO., LTD., Yongin, Gyeonggi-Do (KR)

(72) Inventor: Chan Young Park, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 36 days.

(21) Appl. No.: 14/743,292

(22) Filed: Jun. 18, 2015

(65) Prior Publication Data

US 2016/0203745 A1   Jul. 14, 2016

(30) Foreign Application Priority Data

Jan. 14, 2015 (KR) .................. 10-2015-0006782

(51) Int. Cl.
*G09G 3/00* (2006.01)
*G02B 27/01* (2006.01)

(52) U.S. Cl.
CPC ............. *G09G 3/002* (2013.01); *G02B 27/01* (2013.01); *G09G 2380/02* (2013.01)

(58) Field of Classification Search
CPC ......... G06F 1/1652; G06F 2203/04102; G06F 1/1601; G06F 1/1637; G09G 2380/02; G09G 2320/0693; G09G 2300/04; G09G 2320/0242; G09G 2340/0464; G09G 2340/14; G09G 3/002; G02B 2027/0159; G02B 27/0176; G02B 2027/011; G02B 2027/0116; G02B 27/01
See application file for complete search history.

(56) References Cited

U.S. PATENT DOCUMENTS

| 4,934,771 | A | * | 6/1990 | Rogers | G02B 23/12 359/356 |
|---|---|---|---|---|---|
| 8,928,619 | B1 | * | 1/2015 | Cho | G06F 1/1643 345/173 |
| 9,116,662 | B1 | * | 8/2015 | Song | G06F 1/1601 |
| 2002/0109993 | A1 | * | 8/2002 | Jung | G02B 27/0172 362/318 |
| 2005/0212719 | A1 | * | 9/2005 | Arai | G02B 26/108 345/7 |
| 2012/0113092 | A1 | * | 5/2012 | Bar-Zeev | G02B 27/017 345/419 |
| 2012/0127062 | A1 | * | 5/2012 | Bar-Zeev | G02B 3/14 345/6 |
| 2012/0182416 | A1 | * | 7/2012 | Kawaguchi | H04N 9/3185 348/128 |
| 2013/0050432 | A1 | * | 2/2013 | Perez | H04N 13/0278 348/47 |

(Continued)

FOREIGN PATENT DOCUMENTS

| JP | 2003-050374 A | 2/2003 |
|---|---|---|
| JP | 2010-096864 A | 4/2010 |
| JP | 2011-205358 A | 10/2011 |

*Primary Examiner* — Jose Soto Lopez
(74) *Attorney, Agent, or Firm* — Lee & Morse P.C.

(57) ABSTRACT

A display includes a stretchable display panel, an optical unit that transmits an image displayed on the display panel for image formation, a mechanical unit that changes a physical shape of the display panel in order to compensate a distortion aberration due to the optical unit, and a control unit that drives the display panel in response to an image source signal.

19 Claims, 10 Drawing Sheets

(56) References Cited

U.S. PATENT DOCUMENTS

| | | | | |
|---|---|---|---|---|
| 2013/0278486 A1* | 10/2013 | Duerksen | ............... | G09G 3/34 |
| | | | | 345/55 |
| 2014/0049831 A1* | 2/2014 | Takeda | ............... | G02B 27/0172 |
| | | | | 359/630 |
| 2014/0375845 A1* | 12/2014 | Lee | ............... | G06T 5/006 |
| | | | | 348/241 |
| 2015/0009635 A1* | 1/2015 | Kang | ............... | G09F 9/301 |
| | | | | 361/749 |
| 2015/0130775 A1* | 5/2015 | Kim | ............... | G06F 1/1652 |
| | | | | 345/205 |
| 2015/0187325 A1* | 7/2015 | Yeo | ............... | H04N 5/4403 |
| | | | | 345/156 |
| 2015/0379697 A1* | 12/2015 | Pohl | ............... | G06T 5/006 |
| | | | | 345/589 |
| 2015/0379896 A1* | 12/2015 | Yang | ............... | G02B 27/017 |
| | | | | 434/112 |
| 2016/0006862 A1* | 1/2016 | Park | ............... | H04M 1/72577 |
| | | | | 455/411 |
| 2016/0085319 A1* | 3/2016 | Kim | ............... | G06F 3/0346 |
| | | | | 345/156 |
| 2016/0103488 A1* | 4/2016 | Levesque | ............... | G06F 3/016 |
| | | | | 345/156 |
| 2016/0127674 A1* | 5/2016 | Kim | ............... | G09G 5/003 |
| | | | | 348/739 |
| 2016/0147302 A1* | 5/2016 | Choi | ............... | G02B 27/02 |
| | | | | 345/156 |
| 2016/0189350 A1* | 6/2016 | Glotzbach | ............... | G06T 3/0025 |
| | | | | 345/647 |
| 2016/0195723 A1* | 7/2016 | Murray | ............... | G02B 27/0176 |
| | | | | 359/631 |
| 2016/0212864 A1* | 7/2016 | Lee | ............... | G06F 1/1652 |

* cited by examiner

Plan view Side view

STRETCHABLE DISPLAY APPARATUS WITH COMPENSATING SCREEN SHAPE

CROSS-REFERENCE TO RELATED APPLICATION

Korean Patent Application No. 10-2015-0006782, filed on Jan. 14, 2015, in the Korean Intellectual Property Office, and entitled: "Head Mounted Display Apparatus," is incorporated by reference herein in its entirety.

BACKGROUND

1. Field

Embodiments relate to a head mounted display device. More particularly, the embodiments relate to a head mounted display for correcting a distortion aberration in an optical unit.

2. Description of the Related Art

In general, a head mounted display (HMD) refers to a small-sized image display that is mounted on a head or around eyes to provide virtual reality or an immersive experience. Recently, with an increasing interest in wearable devices, HMDs with a micro display on glasses or the front of a helmet have been developed.

Implementing the HMD may include a method of enlarging and projecting a micro display to an optical unit so that it is projected directly to eyes, a method of enlarging and projecting a micro display to an optical unit so that it is projected to eyes through a connective optical unit, and a method of enlarging and exhibiting a mobile display through an optical unit.

FIG. 1 illustrates a distortion aberration due to an optical unit of a head mounted display of the related art. Referring to FIG. 1, the head mounted display of the related art uses a flat rectangular display panel. An optical unit composed of at least one lens is used to form an image displayed on a display panel. However, in image formation using an optical unit, there is a problem in that the formed image is distorted by the lens aberration.

That is, the iris of an eye functions as an aperture stop and is positioned behind the optical unit, an image A displayed on the flat rectangular display panel, as illustrated in FIG. 1, is illustrated as an image B with the outline distorted due to a distortion aberration of a pin cushion shape by the optical unit.

Due to this problem, a user wearing the HMDs of the related art feels dizzy or the definition is low, so there is a need to correct a distortion aberration.

The above information disclosed in this Background section is only for enhancement of understanding of the background of the invention and therefore it may contain information that does not form the prior art that is already known in this country to a person of ordinary skill in the art.

SUMMARY

An exemplary embodiment provides a display that includes a stretchable display panel, an optical unit to transmit an image displayed on the display panel for image formation, a mechanical unit to change a physical shape of the display panel in order to compensate for a distortion aberration in the image output by the optical unit, and a control unit to drive the display panel in response to an image source signal.

The display panel may be deformed by the mechanical unit to display a correction image distorted in a barrel shape.

The mechanical unit may adjust sides of the display panel to compensate for the distortion aberration.

The mechanical unit may include a plurality of translation modules coupled to sides of the display panel to physically change the shape of the display panel to compensate for the distortion aberration, a driving module that includes an actuator and a motor coupled to the translation modules, the motor to physically move the translation modules to predetermined distances, a driving control module to adjust movement distances of the translation modules, and a distortion analyzing module to calculate individual movement distances of the translation modules in accordance with a size of the display panel and the distortion aberration, and transmits the movement distances to the driving control module.

The mechanical unit may pull the display panel differently at different positions of the sides to compensate for the distortion aberration.

The display may include a bezel unit to couple the translation module, the bezel unit covering a side of the display panel.

The bezel unit may be attached to the side of the display panel with an adhesive or a fastener.

The fastener may pass through the side of the display panel.

The display may include a controller to be operated by a user to adjust a degree of deformation of the display panel.

The image source may include at least one of an image taken by a camera, an image for exhibiting a user interface, an image kept in a memory, a 3D image, and a virtual image produced by an installed program.

The control unit may transmit image signals for a first image and a second image, which have different viewpoints, to display panels for a left eye and a right eye, respectively.

The mechanical unit may adjust corners of the display panel to compensate for the distortion aberration.

The mechanical unit may include a plurality of translation modules coupled to corners of the display panel to physically change the shape of the display panel to compensate for the distortion aberration, a driving module that includes an actuator and a motor coupled to the translation modules, the actuator to physically move the translation modules to predetermined distances by operating the motor, a driving control module that adjusts movement distances of the translation modules, and a distortion analyzing module that calculates individual movement distances of the translation modules which depend on a size of the display panel and the distortion aberration, and transmits the movement distances to the driving control module.

The mechanical unit may move corners of the display panel towards the optical unit.

The display may be a head mounted display.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
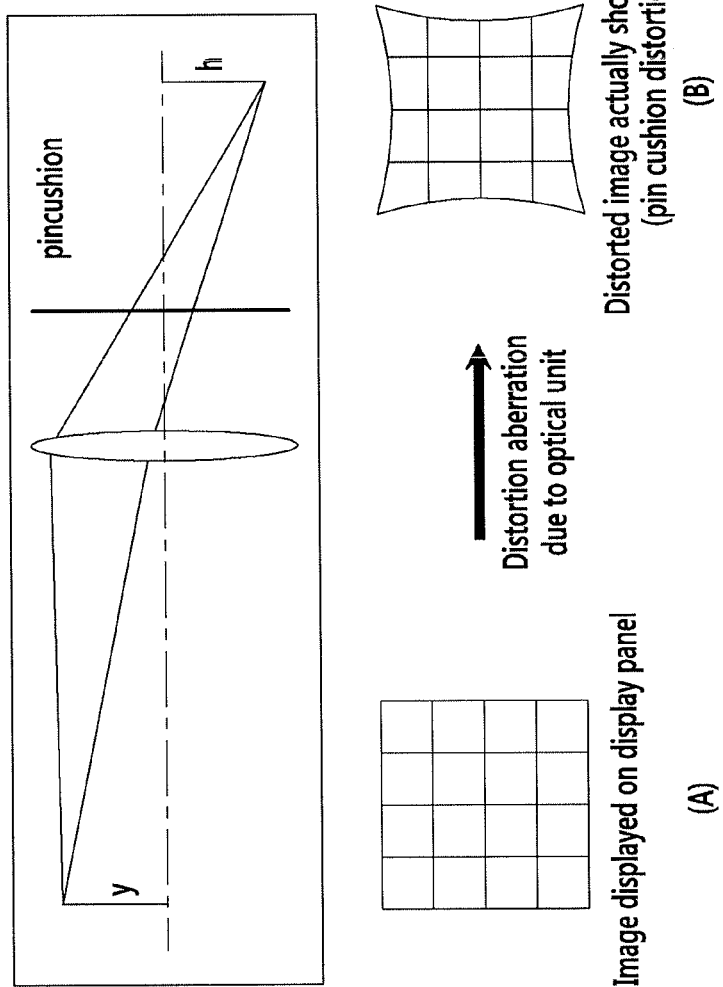
FIG. 1 illustrates a distortion aberration due to an optical unit of a head mounted display of the related art.

In the following detailed description, only certain exemplary embodiments have been illustrated and described, simply by way of illustration. As those skilled in the art would realize, the described embodiments may be modified in various different ways, all without departing from the spirit or scope. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Hereinafter, a head mounted display according to an exemplary embodiment will be described in detail with reference to the drawings.

Figure 2:
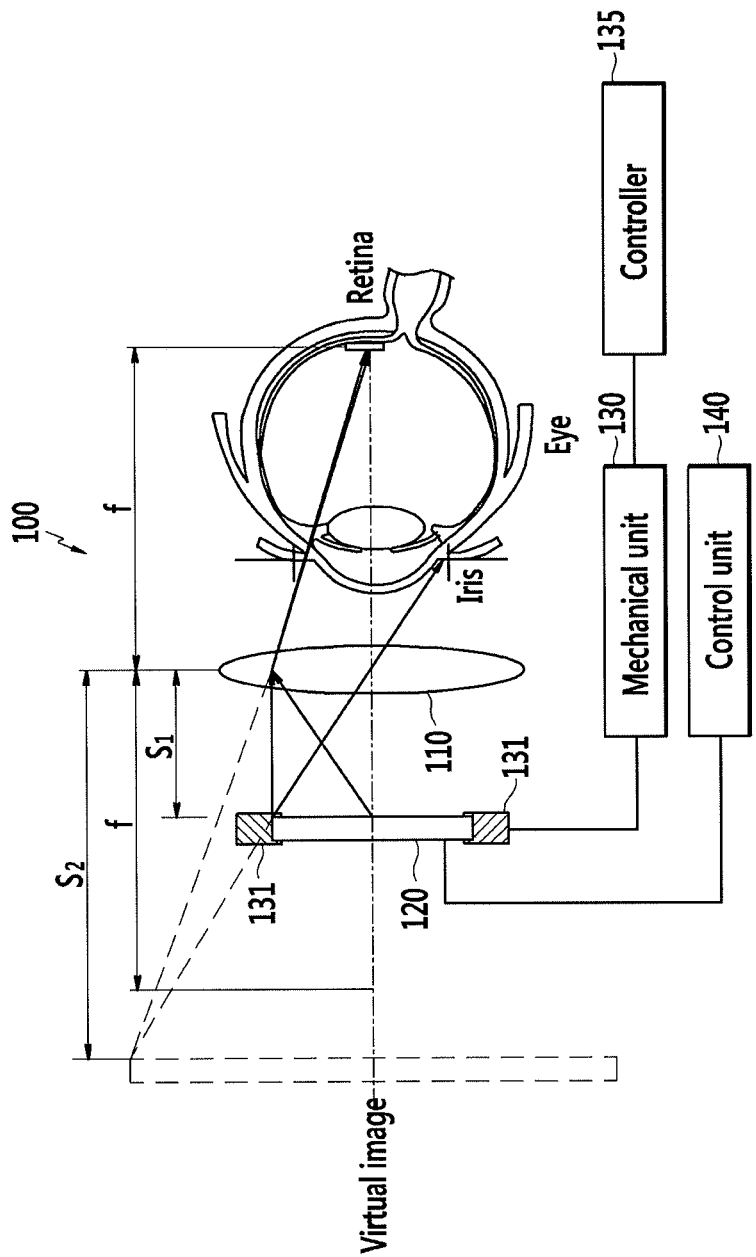
FIG. 2 illustrates a head mounted display according to an exemplary embodiment relative to a viewer.

FIG. 2 illustrates a head mounted display according to an exemplary embodiment relative to a viewer. Referring to FIG. 2, a head mounted display 100 according to an exemplary embodiment includes an optical unit 110, a display panel 120, a mechanical unit 130, and a control unit 140. The mechanical unit may be controlled by a user to a controller 135 to further optimize the display. Though not illustrated in the drawings, the display may further include a body for receiving or fixing and supporting the components.

The optical unit 110 may include a lens that transmits an image displayed on the display panel 120 for image formation on the user's eyes. In the following description, although the optical unit 110 is assumed to be one lens, embodiments are not limited thereto, e.g., may include a plurality of lenses as well as additional optical components that do not have optical power, e.g., such as a prism or a filter.

The display panel 120 is positioned close to the optical unit 110 at a distance smaller than the focal distance of the optical lens 110 (S1<f), and an enlarged erected virtual image is formed on an eye by a lens formula $$\left(\frac{1}{S_1} + \frac{1}{S_2} = \frac{1}{f}\right).$$

The display panel 120 is a stretchable display panel that displays a distorted image due to intensive physical deformation in order to compensate a distortion aberration generated by the optical unit. The display panel 120 may be deformed due to being on a substrate material (for example, polyvinylidene fluoride (PVDF)) that can extend, restore, compress, etc. The mechanical unit 130 adjusts the degree of distortion of the image by changing the physical shape of the display panel 120.

Figure 3:
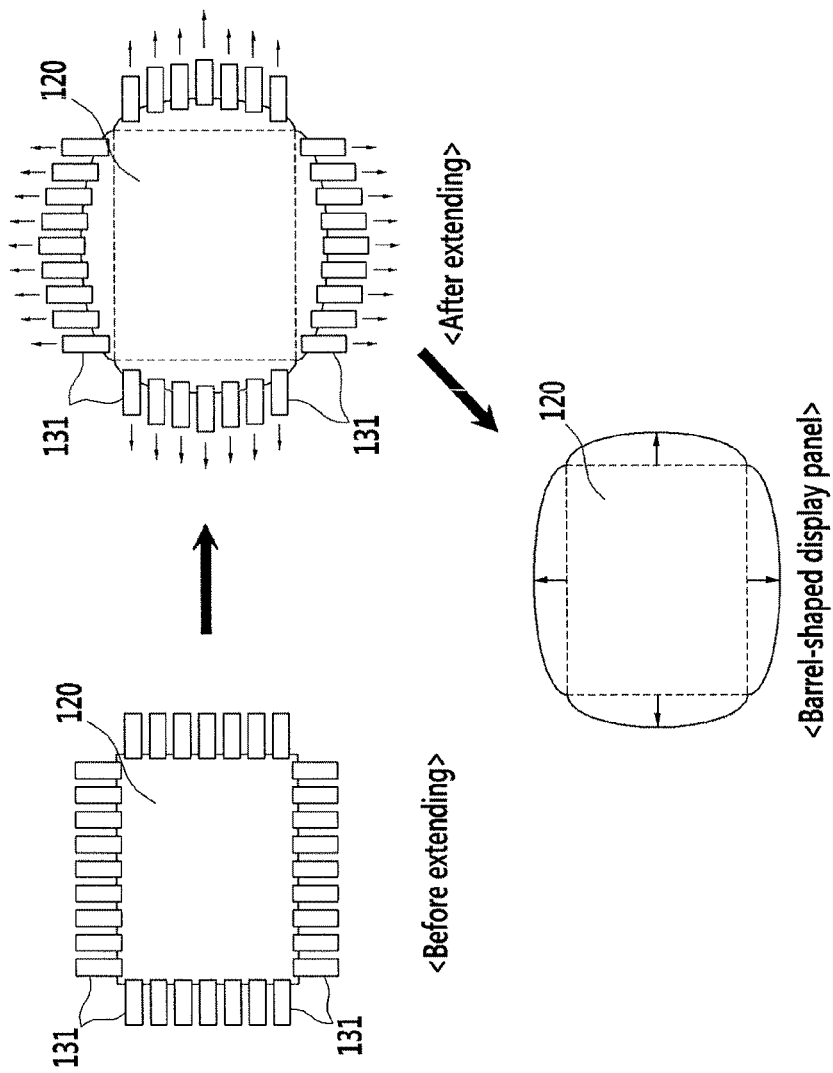
FIG. 3 illustrates a modification method according to a characteristic of extension of a display panel according to an exemplary embodiment.

FIG. 3 illustrates a diagram a modification method of a display panel according to an exemplary embodiment. While the display unit in FIG. 3 is illustrated as being rectangular, the display unit may have any shape.

Referring to FIG. 3, a plurality of translation modules 131, e.g., extension modules, is coupled to the sides of the display panel 120, e.g., around an entire periphery, to physically change the shape of the display panel 120 to compensate for the of the distortion aberration.

The mechanical unit 130 pulls the sides of the display panel 120 to compensate for a distortion aberration of an optical unit. The translation modules 131 pull the display panel 120 into a curved panel with the sides convex in a barrel shape, using a predetermined motor or actuator, described below.

The mechanical unit 130 can adjust the translation length of the display panel for each side independently with the translation modules 131 to fit to a distortion aberration of an optical unit. For example, is, the mechanical unit 130 deforms the sides of the display panel 120 in convex curves by pulling the sides such that the centers of the sides are extended greater than the corners, i.e., with the extension length decreasing from the center to the corners.

The mechanical unit 130 can change the shape of the display panel 120 to fit distortion aberrations of various types of optical units according to the design of HMDs.

The control unit 140 generates an image signal by processing an image source signal and generates a control signal for displaying an image signal on the display panel 120. The image source includes an image taken by a camera (not illustrated), an image for exhibiting a user interface (UI), an image stored in a memory, a three-dimensional (3D) image, and a virtual image produced by an installed program.

The image source signal can exhibit at least two images based on at least two view points for displaying a 3D image. The control unit 140 transmits an image signal based on an image source signal at a view point on a display panel, which corresponds to the image source signal at the view point, of display panels 120-1 and 120-2.

Figure 4:
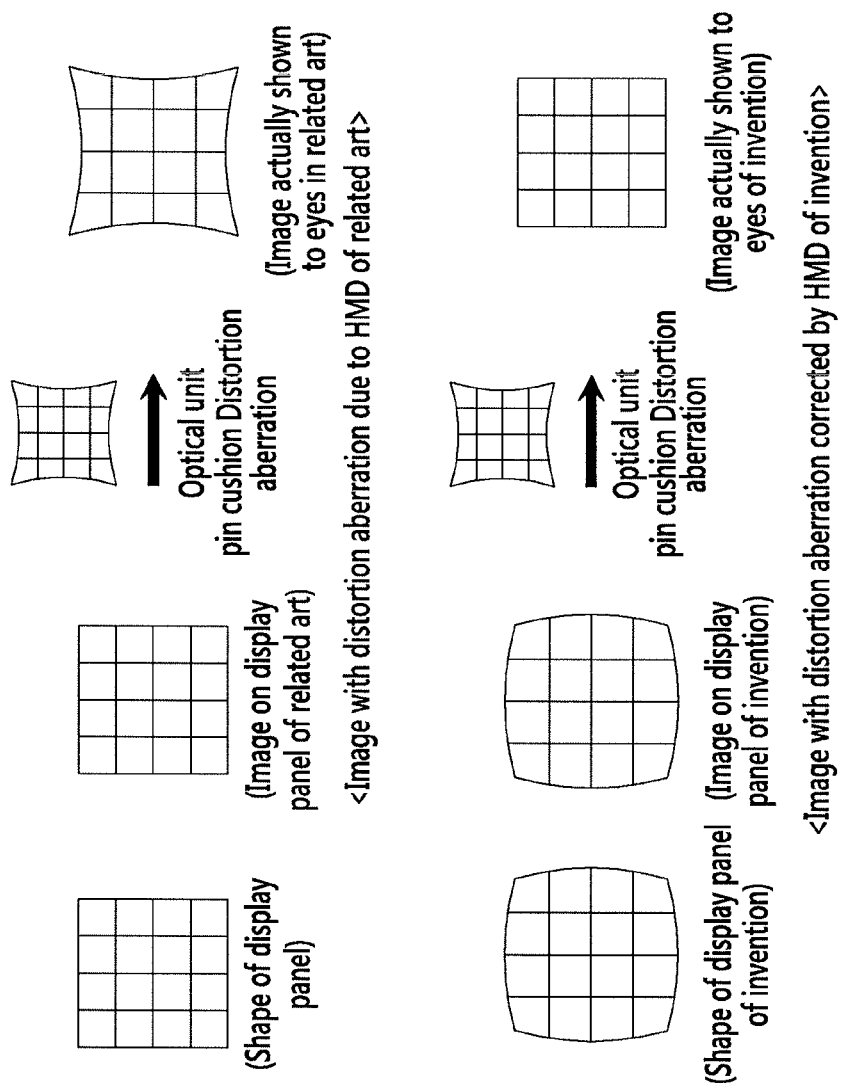
FIG. 4 illustrates a conceptual diagram of correcting a distortion aberration due to an optical unit according to an exemplary embodiment.

FIG. 4 is a conceptual diagram of correcting a distortion aberration due to an optical unit according to an exemplary embodiment.

Referring to FIG. 4, as described above, in the HMDs of the related art, a pin cushion distortion aberration is generated while a square display image according to the shape of a display panel passes through an optical unit, so the image seen to an eye exhibits a pin cushion shape.

On the other hand, in the shape of the display panel 120 according to an exemplary embodiment, the sides are intentionally deformed to compensate for the distortion aberration, e.g., to correct for a pin cushion distortion aberration, the display panel is distorted to be barrel-shaped.

In an exemplary embodiment, the barrel-shaped display panel image obtained by deforming the display panel 120 can be defined as a correction image for compensating a distortion aberration due to the optical unit 110. The barrel-shaped display panel image (i.e. correction image) compensates the pin cushion distortion aberration while passing through the optical unit 110, so the image actually seen to an eye can be viewed as a normal square image.

As described above, correcting a distortion aberration due to an optical unit according to an exemplary embodiment can be simply achieved by physically deforming the display panel 120 with the mechanical unit 130.

Figure 5:
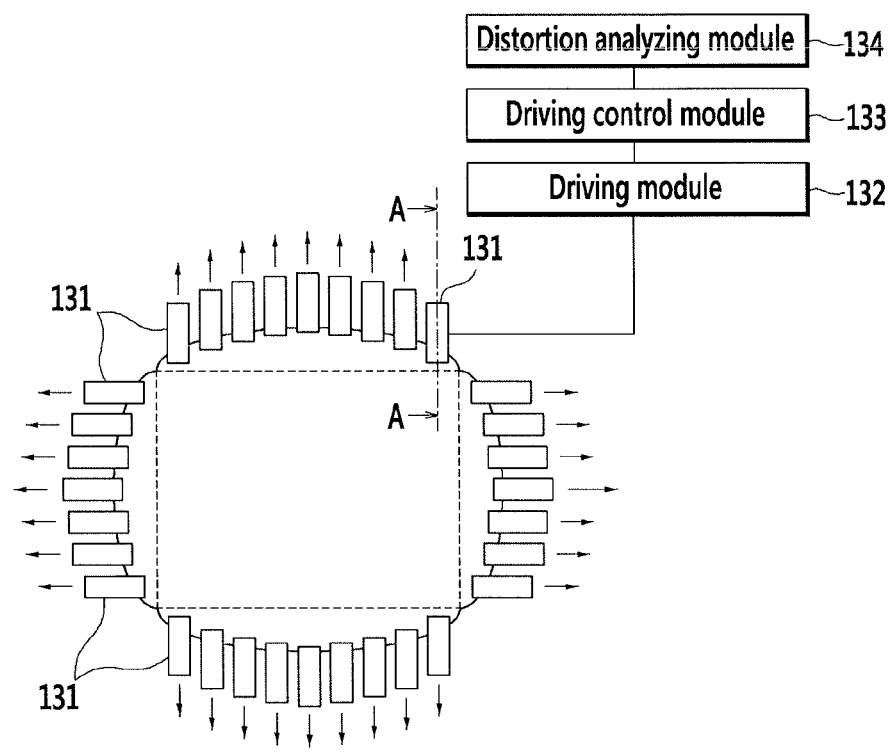
FIG. 5 illustrates a block diagram of a mechanical unit according to an exemplary embodiment.
Figure 6:
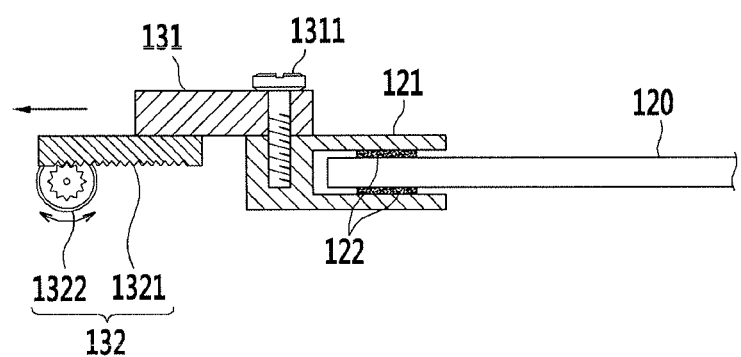
FIG. 6 illustrates a cross-sectional view taken along line A-A of a combination structure of a translation module according to an exemplary embodiment.

Hereafter, the mechanical unit 130 according to an exemplary embodiment will be described in more detail. FIG. 5 illustrates a configuration of a mechanical unit according to an exemplary embodiment. FIG. 6 illustrates a cross-sectional view taken along line A-A of a combination structure of an translation module according to an exemplary embodiment.

Referring to FIGS. 5 and 6, the mechanical unit 130 according to an exemplary embodiment includes translation modules 131, a driving module 132, a driving control module 133, and a distortion analyzing module 134.

The translation modules 131, as described above, are coupled to the sides of the display panel 120. The translation modules 131 may be coupled by a bezel unit 121 covering the side of the display panel 120 and a fastener 1311. The bezel unit 121 may be an elastic member and may receive a side of the display panel 120 in a groove formed at a side and may be integrally fixed to the display panel by an adhesive 122.

The driving module 132 includes an actuator 1321 and a motor 1322 coupled to the translation module 131. The motor 1322 physically pulls (or pushes) and moves the translation module 131 to a predetermined distance. The predetermined distance means the individual movement distance of translation modules 131 such that the sides are curved or otherwise compensate for distortion.

The driving control module 133 adjusts the movement distances of the translation modules 131 such that correction images of the translation modules 131 separated in accordance with a distortion aberration of the screen that a user looks at offset the distortion aberration. The driving control module 133 can adjust the degree of deformation of the display panel 120 on the basis of selection by a user by controlling the driving module 132 through a controller, because the users of an HMD may have different physical characteristics, e.g., different body sizes, different face sizes, different eye spacing, different nose shapes, different nose heights, and so forth.

The distortion analyzing module 134 calculates the movement distances of the translation modules 131, which depend on the size of the display panel 120 and the characteristics of the optical unit 110, and transmits them to the driving control module 133 so that the positions of the translation modules 131 can be adjusted.

According to this configuration, the mechanical unit 130 keeps the display panel 120 extended in the optimal correction image that a user looks at. The translation modules 131 can pull (or push) the display panel 120 directly through the bezel units 121, depending on how the translation modules 131 are fastened to the display panel 120.

Figure 7:
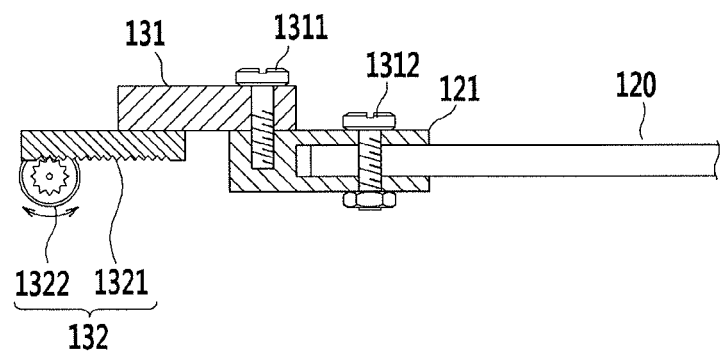
FIGS. 7 to 9 illustrate cross-sectional views taken along line A-A which illustrates a combination structure of another type of translation module according to an exemplary embodiment.
Figure 8:
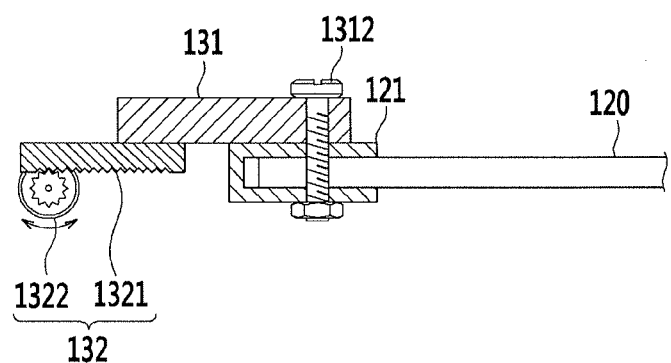
Figure 9:
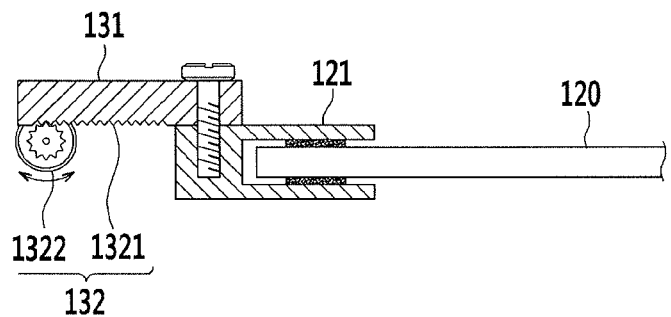

FIGS. 7 to 9 are cross-sectional views taken along line A-A which illustrates a combination structure of another type of translation module according to an exemplary embodiment. In the following description of various fastening manners for the translation modules 131, description of components of the configuration similar to that described above are not repeated.

As illustrated in FIG. 7, the bezel unit 121 and the side of the display panel 120 may be fixed by a fastener 1312, rather than by an adhesive 122.

As illustrated in FIG. 8, the translation module 131, the bezel unit 121, and the display panel 120 are combined by one fastener 1312, rather than a separate fastener 1131. In this case, the translation module 131 can directly pull the display panel 110.

As illustrated in FIG. 9, an actuator 1321 may be integrally formed on the bottom of the translation module 131, reducing a size and/or weight of an HMD.

Figure 10:
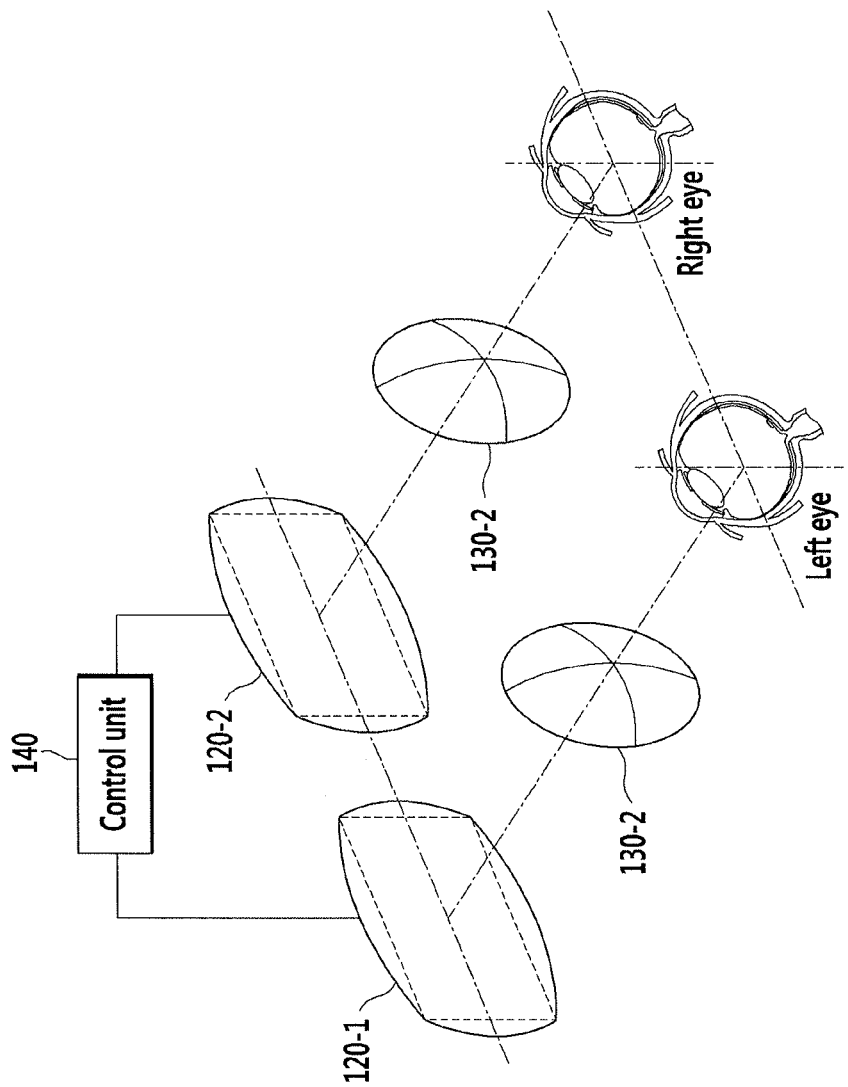
FIG. 10 illustrates an exemplary use of the head mounted display according to an exemplary embodiment.

FIG. 10 illustrates an exemplary use of the head mounted display according to an exemplary embodiment. Referring to FIG. 10, the head mounted display 100 according to an exemplary embodiment includes a plurality of sets composed of the display panel 120 and the optical unit 110 for both eyes, i.e., each set is for one eye.

The control unit 140 of the head mounted display can display 3D images with different parallaxes on display panels 120-1 and 120-2 for the left and right eyes, respectively. That is, the control unit 140 displays different images for the left eye and the right eye in the HMD, so that a user can view a 3D image.

Figure 11:
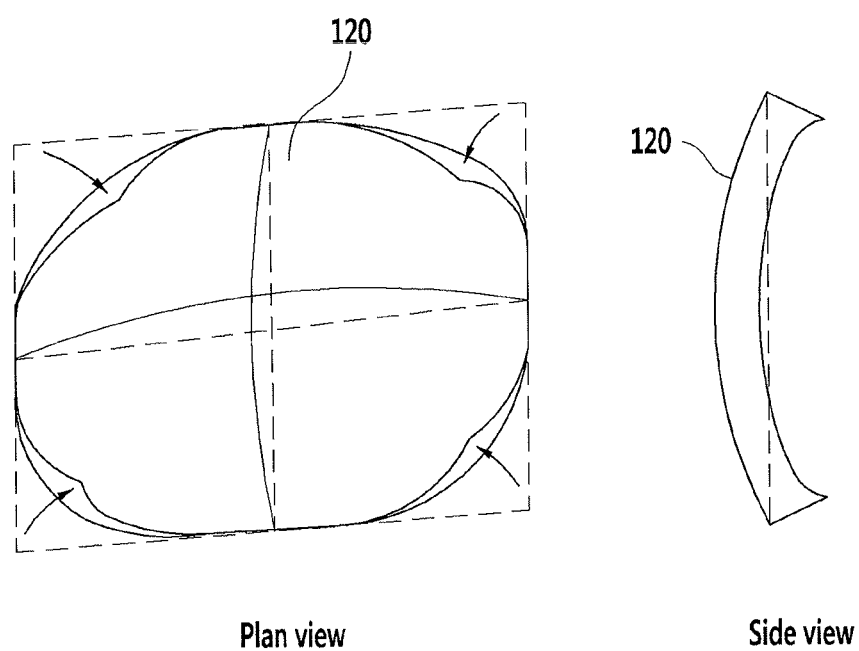
FIG. 11 illustrates a curved flexible display panel according to another exemplary embodiment.

FIG. 11 illustrates a curved flexible display panel according to another exemplary embodiment. Referring to FIG. 11, according to another exemplary embodiment, the corners of a flexible display panel 120 may be pushed inward, e.g., towards the optical unit 110, while not changing dimensions of the display panel, using a mechanical unit (not illustrated). Although the mechanical unit is not illustrated in the figure, as in the previous exemplary embodiment, a mechanical unit to deform the display panel 120 may be provided to push the corners of the display panel inward, so the detailed description is not provided.

Figure 12:
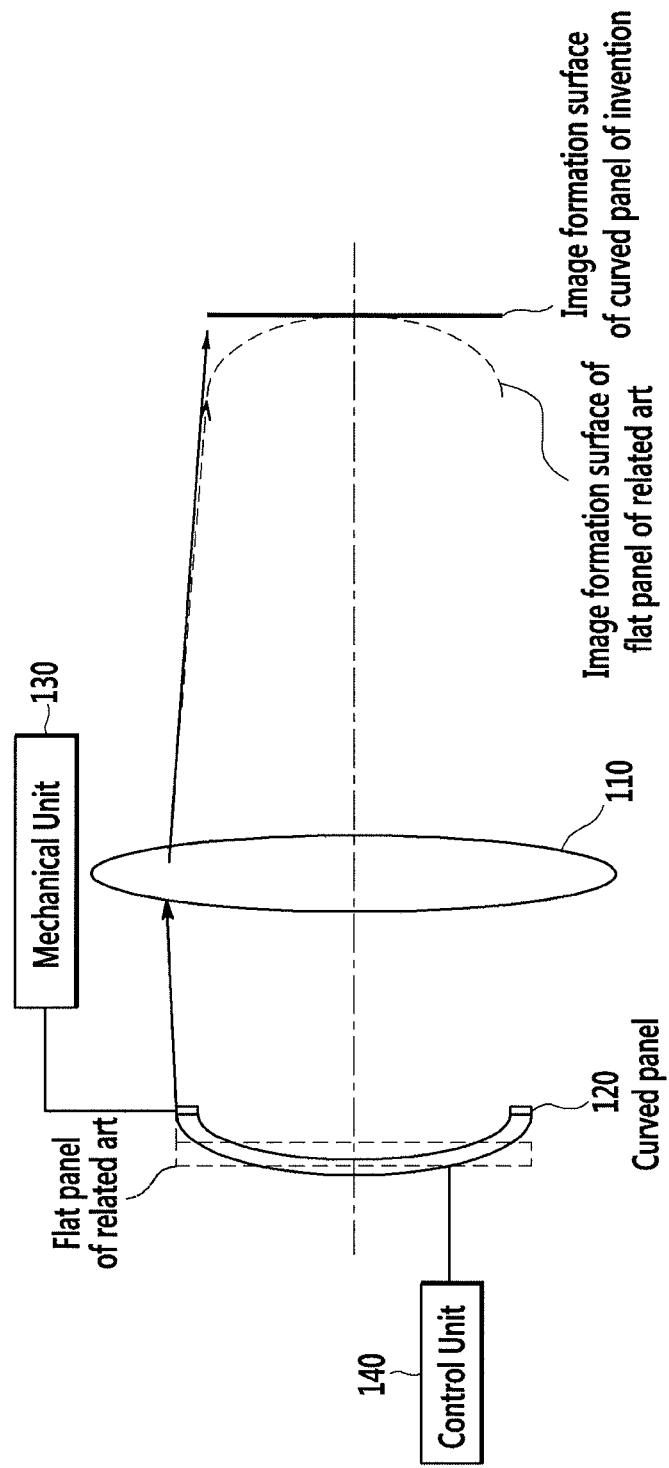
FIG. 12 illustrates an image formation surface corrected by a curved display panel according to an exemplary embodiment.

FIG. 12 illustrates an image formation surface corrected by a curved display panel according to an exemplary embodiment. Referring to FIG. 12, the display panel according to an exemplary embodiment is concavely curved without changing dimensions of the display panel.

In the existing flat display panels, there was problem in that the image formation surface is bent by a distortion aberration due to an optical unit and becomes out of focus as it goes to the outside, thereby distorting an image.

The display panel is concavely curved such that the distance from the optical unit 110 decreases from the center to the periphery, e.g., at the corners, a distortion aberration maybe compensated such that the image is flat undistorted. In particular, the mechanical unit 130 may be push (or pull) corners of the display panel 120 towards the optical unit 110.

As described above, according to an exemplary embodiment, a clear image may be displayed by correcting a distortion aberration due to an optical unit in a head mounted display. Further, since the display panel maybe deformed to compensate for distortion aberrations due to various optical units available for head mounted displays, an image may be simply corrected. Thus, by changing the shape, e.g., curve, stretch, contract, and so forth, of the display to offset distortions in the optical system, a corrected image may be displayed.

Further, since distortion aberrations may be corrected by changing the shape of a display panel, a head mounted display may use a simple optical unit rather the existing complicated optical units, decreasing size and/or cost.

Finally, while the above description has been directed to a head mount display, embodiments may be employed with other projection systems.

Exemplary embodiments are not implemented only by the apparatus and/or method described above, and may be implemented by programs that implement the function of the configurations in the exemplary embodiments or recording medium having the programs, and embodiments can be easily implemented by those skilled in the art from the exemplary embodiments described above.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display, comprising:
a stretchable display panel;
an optical unit to transmit an image displayed on the display panel for image formation;
a mechanical unit to change a physical shape of the display panel in order to compensate for a distortion aberration in the image output by the optical unit; and
a control unit to drive the display panel in response to an image source signal,
wherein the mechanical unit includes:
a plurality of translation modules coupled to sides of the display panel to physically change the shape of the display panel to compensate for the distortion aberration;
a driving module that includes an actuator and a motor coupled to the translation modules, the motor to physically move the translation modules to predetermined distances;
a driving control module to adjust movement distances of the translation modules; and
a distortion analyzing module to calculate individual movement distances of the translation modules in accordance with a size of the display panel and the distortion aberration, and transmits the movement distances to the driving control module.

2. The display as claimed in claim 1, wherein the display panel is deformed by the mechanical unit to display a corrected image distorted in a barrel shape.

3. The display as claimed in claim 1, wherein the mechanical unit is to adjust sides of the display panel to compensate for the distortion aberration.

4. The display as claimed in claim 1, wherein the mechanical unit pulls the display panel differently at different positions of the sides to compensate for the distortion aberration.

5. The display as claimed in claim 1, further comprising:
a bezel unit to couple the translation modules, the bezel unit covering a side of the display panel.

6. The display as claimed in claim 5, wherein:
the bezel unit is attached to the side of the display panel with an adhesive or a fastener.

7. The display as claimed in claim 6, wherein:
the fastener passes through the side of the display panel.

8. The display as claimed in claim 1, wherein:
further comprising a controller to be operated by a user to adjust a degree of deformation of the display panel.

9. The display as claimed in claim 1, wherein:
the image source signal includes at least one of an image taken by a camera, an image for exhibiting a user interface, an image kept in a memory, a 3D image, and a virtual image produced by an installed program.

10. The display as claimed in claim 1, wherein:
the control unit is to transmit image signals for a first image and a second image, which have different viewpoints, to display panels for a left eye and a right eye, respectively.

11. The display as claimed in claim 1, wherein the mechanical unit is to adjust corners of the display panel to compensate for the distortion aberration.

12. The display as claimed in claim 11, wherein the mechanical unit includes:
a plurality of translation modules coupled to corners of the display panel to physically change the shape of the display panel to compensate for the distortion aberration;
a driving module that includes an actuator and a motor coupled to the translation modules, the actuator to physically move the translation modules to predetermined distances by operating the motor;
a driving control module that adjusts movement distances of the translation modules; and
a distortion analyzing module that calculates individual movement distances of the translation modules which depend on a size of the display panel and the distortion aberration, and transmits the movement distances to the driving control module.

13. The display as claimed in claim 11, wherein:
the mechanical unit moves corners of the display panel towards the optical unit.

14. The display as claimed in claim 1, wherein the display is a head mounted display.

15. The display as claimed in claim 1, wherein the display panel has a first edge coupled to the mechanical unit, the mechanical unit to move the first edge relative to an opposite second edge so as to change the shape of the display panel.

16. The display as claimed in claim 15, wherein the mechanical unit is to pull the first edge away from the opposite second edge so as to place the first edge in a convex shape in plan view.

17. The display as claimed in claim 15, wherein the opposite second edge is connected to the mechanical unit and the mechanical unit is to pull both edges away from each other.

18. The display as claimed in claim 15, wherein the first and second edges are sides of the display panel.

19. The display as claimed in claim 15, wherein the first and second edges are corners of the display panel.

* * * * *